United States Patent [19]

Greaves

[11] Patent Number: 5,049,304

[45] Date of Patent: Sep. 17, 1991

[54] SCALE CONTROL ADMIXTURES

[75] Inventor: Brian Greaves, Runcorn, England

[73] Assignee: W. R. Grace & Co.-Conn., New York, N.Y.

[21] Appl. No.: 454,101

[22] Filed: Dec. 20, 1989

[30] Foreign Application Priority Data

Dec. 20, 1988 [GB] United Kingdom ............... 8829612

[51] Int. Cl.$^5$ ............................................. C02F 5/10
[52] U.S. Cl. ..................................... 252/180; 210/700
[58] Field of Search .................. 252/180, 181, 86, 84, 252/87; 210/700

[56] References Cited

U.S. PATENT DOCUMENTS

| | | | |
|---|---|---|---|
| 3,429,914 | 2/1969 | Crutchfield et al. | 562/12 |
| 3,671,448 | 6/1972 | Kowalski | 252/180 |
| 3,891,568 | 6/1975 | Nishio et al. | 252/181 |
| 4,008,164 | 2/1977 | Watson et al. | 252/180 |
| 4,406,811 | 9/1983 | Christensen et al. | 252/389.22 |
| 4,563,284 | 1/1986 | Amjad | 252/180 |
| 4,566,974 | 1/1986 | Masler, III et al. | 252/180 |
| 4,600,524 | 7/1986 | Cuisia et al. | 252/86 |
| 4,640,793 | 2/1987 | Persinski et al. | 252/84 |
| 4,806,259 | 2/1989 | Amjad | 252/87 |

Primary Examiner—David L. Lacey
Assistant Examiner—Thomas E. Daley

Attorney, Agent, or Firm—James P. Barr

[57] ABSTRACT

A composition suitable for addition to an aqueous system which comprises a mixture of the following three components (i) a phosphonocarboxylic acid which contains at least 3 acid groups which are carboxylic and phosphonic acid groups, such that at least one acid group is a carboxylic acid group and at least one acid group is a phosphonic acid group, at least the said 3 acid groups being attached to carbon atoms, or a water-soluble salt thereof, (ii) an amino phosphonic acid having the formula:

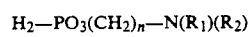

$$H_2-PO_3(CH_2)_n-N(R_1)(R_2)$$

in which $R_1$ and $R_2$ independently represent hydrogen, alkyl, of 1 to 4 carbon atoms, $-(CH_2)_nPO_3H_2$, or $-(CH_2)_nCOOH$, and n is 1 or 2, or a water-soluble salt thereof, and (iii) an aminophosphonic acid oxide of the formula:

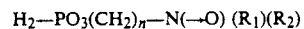

$$H_2-PO_3(CH_2)_n-N(\rightarrow O)(R_1)(R_2)$$

in which $R_1$, $R_2$ and n are as defined above, or a water-soluble salt thereof.

15 Claims, No Drawings

SCALE CONTROL ADMIXTURES

The present invention relates to the treatment of aqueous systems, and, more particularly, to inhibiting and removing scale which forms in cooling systems.

It is well known that when water, especially hard water, is heated scale forms on the surfaces which come into contact with the water. Thus scale also forms on the hot surfaces which come into contact with cooling water. Scale also forms in boilers.

A variety of different synthetic and naturally occurring chemicals has been employed as additives to the water in order to try and reduce the formation of scale. The reason for this is that as the scale builds up there is a reduction in heat transfer across the heat exchange surfaces and, in some instances, localised over-heating can occur.

As indicated, a variety of different chemicals including water soluble polymers, phosphonates and chelating agents has been used to combat scale formation. It has now been found, according to the present invention, that particularly good scale inhibition can be obtained by using a combination of three particular types of phosphonate. According to the present invention there is provided a method for treating an aqueous system, especially a boiler water or cooling system, which comprises adding thereto:
(i) a phosphonocarboxylic acid which contains at least 3 acid groups which are carboxylic and phosphonic acid groups, such that at least one acid group is a carboxylic acid group and at least one acid group is a phosphonic acid group, at least the said 3 acid groups being attached to carbon atoms, or a water-soluble salt thereof,
(ii) an amino phosphonic acid having the formula:

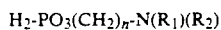

in which $R_1$ and $R_2$ independently represent hydrogen, alkyl, of 1 to 4 carbon atoms, $-(CH_2)_nPO_3H_2$, or $-(CH_2)_nCOOH$ and n is 1 or 2, or a water-soluble salt thereof, and
(iii) an aminophosphonic acid oxide of the formula:

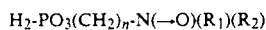

in which $R_1$, $R_2$ and n are as defined above, or a water-soluble salt thereof.

It has surprisingly been found that the use of these three phosphonates in combination gives more effective scale inhibition than the use of any of the phosphonates individually or any combination of two of them. Further, while it has been proposed to use the specified phosphonocarboxylic acids and the amino phosphonates this has been for the purpose of inhibiting corrosion in cooling systems and not for the prevention of scale.

The present invention has particular applicability in hard water systems where scale is due principally to the formation of calcium carbonate, typically at least 300 ppm calcium hardness combined with 300 ppm M alkalinity at cooling water temperatures, e.g. 40°–50° C., or equivalent amounts under different water conditions. It is particularly surprising that the combination is so effective because the conversion of the amino phosphonate to the corresponding N-oxide results in a material with lower calcium tolerance than the initial amino phosphonate. One of skill in the art will appreciate that low calcium tolerance is detrimental to an additive which is to be used as a scale inhibitor in waters having a high calcium content because this will give rise to the precipitation of calcium phosphonate which not only eliminates the phosphonate as a scale inhibitor but also causes scaling of calcium phosphonate.

The amino phosphonate employed is preferably one in which $R_1$ and $R_2$ both represent methyl phosphonate i.e. the amino phosphonate compound is amino tri(methylene phosphonic acid) (ATMP). While the oxide used need not necessarily be the oxide corresponding to the amino phosphonate employed it will normally be convenient to do so. The preferred aminophosphonic acid oxide is amino tri(methylene phosphonic acid)-N-oxide (i.e. $R_1$ and $R_2$ both represent methyl phosphonic acid (ATMP-N-O)).

Component (i) preferably possesses the general formula:

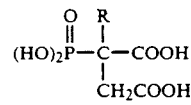

wherein R is hydrogen, alkyl, alkenyl or alkynyl having up to 4 carbon atoms; phenyl; cycloalkyl having 3 to 6 carbon atoms; benzyl; phenethyl or

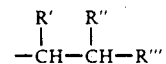

wherein R' is hydrogen, alkyl having 1 to 4 carbon atoms or carboxyl, R'' is hydrogen or methyl and R''' is carboxyl or phosphonate. 2-phosphonobutane-1,2,4-tricarboxylic acid (PBTC), a commercially available material, is particularly preferred. Another preferred material is 2,4-diphosphonobutane-1,2-dicarboxylic acid.

If the phosphonates are used in the form of salts, typical salts include alkali metal, especially sodium or potassium, ammonium or lower amine salts such as salts of mono-, di- or tri-ethanolamine.

The total amounts of each component incorporated in the aqueous system can vary between quite wide limits but, in general, amounts from 0.1 to 50 ppm of each component is present. Preferably the amount of each component is 1.0 to 20 ppm, especially 1 to 12 ppm. Although the components can be added separately to the system it will normally be convenient to add them together as a formulation.

Accordingly, the present invention also provides a composition suitable for addition to an aqueous system which comprises components i, ii and iii, as defined above, typically as an aqueous solution. Any water can be used provided the components do not precipitate; the use of base exchanged water is preferred.

In such compositions component (i) will normally be present in an amount from 15 to 90%, preferably 40 to 70% and especially 40 to 55% by weight (active). The amount of amino phosphonic acid (component (ii)) will generally be from 5 to 50%, preferably 15 to 30%, and especially 20 to 25% by weight (active) while the amount of oxide will generally be from 5 to 50%, preferably 15 to 30%, and especially 25 to 30% by weight (active). A preferred formulation comprises 3 to 6% by weight (active) PBTC, 1.5 to 3% by weight (active) of ATMP and 1.5 to 3% by weight (active) of ATMP—N-O in base exchanged, or soft, water.

In addition to the three phosphonates it is possible to incorporate into the composition or add to the aqueous system other chemicals used in the treatment of aqueous systems. Such materials include scale inhibiting polymers such as polyacrylic and polymethacrylic acids, typically having a molecular weight from 1000 to 5000, dispersants such as sulphonated polymers e.g. copolymers of acrylic or methacrylic acid and 2-methyl-2-acrylamido propane sulphonic acid, and copolymers of maleic acid and alkylsulphonic or styrene sulphonic acids, and azoles such as benzotriazole, tolyltriazole, and mercaptobenzotriazole.

Such scale inhibiting polymers and dispersants will normally be present in the aqueous system in an amount from 1 to 10 ppm, preferably 1 to 5 ppm, while the azoles will normally be present in an amount from 1 to 10 ppm, preferably 1 to 3 ppm. In the compositions according to the present invention the scale inhibiting polymers and dispersants will normally be present in an amount from 30 to 50% by weight, and the azoles will normally be present in an amount from 20 to 50% by weight, based on the total weight of phosphonate. In the preferred formulation mentioned above, the scale inhibiting polymers and dispersants will typically be present in an amount from 2 to 3% by weight while the corresponding amount of azole will be 1 to 2% by weight.

The following Examples further illustrate the present invention.

EXAMPLE

Tests were carried out on a laboratory simulated cooling system involving the use of a heat exchanger and cooling tower, the conditions and test results being as follows:

| System water: | 600 ppm calcium hardness/600 ppm "M" alkalinity |
|---|---|
| Water temperature: | 40° C. |
| Water Flow Rate in Heat Exchanger: | 0.3 ft/sec. |
| pH: | 9.3 |

| Test No. | Additive | Dose ppm | Scaling Rate, mg/24 hours |
|---|---|---|---|
| 1 | ATMP | 1.5 | |
| | ATMP-N—O | 1.5 | 80** |
| | PBTC | 3.0 | |
| 2 | ATMP | 3.0 | |
| | PBTC | 3.0 | 180 |
| 3 | ATMP-N—O | 3.0 | |
| | PBTC | 3.0 | 460 |
| 4 | PBTC | 6.0 | 338* |
| 5 | ATMP | 6.0 | 225* |
| 6 | ATMP-N—O | 6.0 | 239* |

*Heavy precipitation of calcium carbonate in the circulating water.
**No visible precipitation in the circulating water.

If no additive is used, scaling will take place and, in addition, calcium carbonate will precipitate in the bulk water phase causing very significant system fouling.

It can thus be seen that the use of the combination of three phosphonates results in substantially less scaling than would be expected from the behavior of the individual components or combinations of two of the three components.

I claim:

1. A composition suitable for addition to an aqueous system which comprises a mixture of the following three components;
   (i) a phosphonocarboxylic acid which contains at least 3 acid groups which are carboxylic and phosphonic acid groups, such that at least one acid group is a carboxylic acid group and at least one acid group is a phosphonic acid group, at least the said 3 acid groups being attached to carbon atoms, or a water-soluble salt thereof,
   (ii) an amino phosphonic acid having the formula:

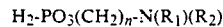
   $$H_2\text{-}PO_3(CH_2)_n\text{-}N(R_1)(R_2)$$

in which $R_1$ and $R_2$ independently represent hydrogen, alkyl of 1 to 4 carbon atoms, $-(CH_2)_nPO_3H_2$, or $-(CH_2)_nCOOH$, and n is 1 or 2, or a water-soluble salt thereof, and
   (iii) an aminophosphonic acid oxide of the formula:

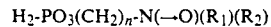
   $$H_2\text{-}PO_3(CH_2)_n\text{-}N(\rightarrow O)(R_1)(R_2)$$

in which $R_1$, $R_2$ and n are as defined above, or a water-soluble salt thereof.

2. A composition according to claim 1 in which the amino phosphonic acid is amino tri(methylene phosphonic acid), the amino phosphonic acid oxide is amino tri(methylene phosphonic acid)-N-oxide and the phosphonocarboxylic acid is 2-phosphonobutane-1,2,4-tricarboxylic acid.

3. A composition according to claim 1 in which component (i) is present in an amount from 15 to 90% by weight.

4. A composition according to claim 3 in which component (i) is present in an amount from 40 to 70% by weight.

5. A composition according to claim 4 in which component (i) is present in an amount from 45 to 55% by weight.

6. A composition according to claim 1 in which component (ii) is present in an amount from 35 to 55% by weight.

7. A composition according to claim 6 in which component (ii) is present in an amount from 15 to 30% by weight.

8. A composition according to claim 7 in which component (ii) is present in an amount from 20 to 25% by weight.

9. A composition according to claim 1 in which component (iii) is present in an amount from 5 to 50% by weight.

10. A composition according to claim 9 in which component (iii) is present in an amount from 15 to 30% by weight.

11. A composition according to claim 10 in which component (iii) is present in an amount from 20 to 25% by weight.

12. A composition according to claim 1 which comprises 3 to 6% by weight 2-phosphonobutane-1,2,4-tricarboxylic acid and 1.5 to 3% by weight of each of amino tri(methylene phosphonic acid)-N-oxide.

13. A composition according to claim 1 which also comprises at least one of a scale inhibiting polymer, a dispersant and an azole.

14. A composition according to claim 13 in which the scale inhibiting polymer dispersant is present in an amount from 30 to 50% by weight and the azole is present in an amount from 20 to 50% by weight, based on the total weight of phosphate.

15. A composition according to claim 13 in which the scale inhibiting polymer and dispersants are present in an amount from 2 to 3% by weight and the azole is present in an amount from 1 to 2% by weight.

* * * * *